(12) United States Patent
Cheresko

(10) Patent No.: US 6,250,154 B1
(45) Date of Patent: Jun. 26, 2001

(54) OIL AND GAS METERING AND MEASURING DEVICE

(76) Inventor: Daniel G. Cheresko, 11300 N. Fairlane Dr., South Lyon, MI (US) 48178

( * ) Notice: Subject to any disclaimer, the term of this patent is extended or adjusted under 35 U.S.C. 154(b) by 0 days.

(21) Appl. No.: 09/180,317
(22) PCT Filed: May 6, 1997
(86) PCT No.: PCT/US97/07664
§ 371 Date: Nov. 4, 1998
§ 102(e) Date: Nov. 4, 1998
(87) PCT Pub. No.: WO97/42468
PCT Pub. Date: Nov. 13, 1997

Related U.S. Application Data
(60) Provisional application No. 60/016,953, filed on May 6, 1996.

(51) Int. Cl.[7] .............................. G01F 19/00; G01N 1/14; G01N 1/12; B01L 3/02
(52) U.S. Cl. ...................... 73/426; 73/864.13; 73/864.16; 73/864.17; 73/864.63
(58) Field of Search ................................ 73/426, 864.87, 73/864.17, 864.13, 864.16, 864.63, 428

(56) References Cited

U.S. PATENT DOCUMENTS

| | | | |
|---|---|---|---|
| 4,098,125 | * | 7/1978 | Lee ........................ 73/425.6 |
| 4,210,261 | * | 7/1980 | Trujilo et al. ............ 222/43 |
| 4,660,424 | * | 4/1987 | Permer ..................... 73/864.83 |
| 4,721,393 | * | 1/1988 | Kwast ...................... 366/341 |
| 4,750,373 | * | 6/1988 | Shapiro .................... 73/864.87 |
| 4,815,861 | * | 3/1989 | Heppenstiel et al. ....... 366/130 |
| 4,957,008 | * | 9/1990 | Proni et al. ............... 73/864.83 |
| 5,253,785 | * | 10/1993 | Haber et al. ............. 222/43 |
| 5,320,810 | * | 6/1994 | Al-Mahareeq .............. 422/100 |
| 5,406,995 | * | 4/1995 | Gantzer .................... 141/325 |

OTHER PUBLICATIONS

The homepage of Applied Scientific, a lab equipment store. http://www.appliedsci.com/.*

* cited by examiner

Primary Examiner—Hezon Williams
Assistant Examiner—Dennis Loo
(74) Attorney, Agent, or Firm—Gifford, Krass, Groh, Sprinkle, Anderson & Citkowski, P.C.

(57) ABSTRACT

A fluid metering and measuring device is provided and which is particularly adapted to regulate ratios of oil and gasoline in a mixture of oil and gasoline used, for example, in a two-stroke engine. The device has a filling chamber with a fluid inlet and a fluid outlet. One-way check valves are disposed in both the fluid inlet and the fluid outlet to prevent backflow. A plunger stem comprising a piston disposed within the chamber. When the stem and attached piston are pulled upwardly, a vacuum is created in the chamber to cause a fluid, e.g. oil to flow into chamber and when depressed causes outflow. Gradations or indicia indicate the amount of oil drawn into the chamber to ensure proper fluid ratios. The metering device may be incorporated into any suitable container including a two compartment container wherein the compartments are in fluid communication.

14 Claims, 4 Drawing Sheets

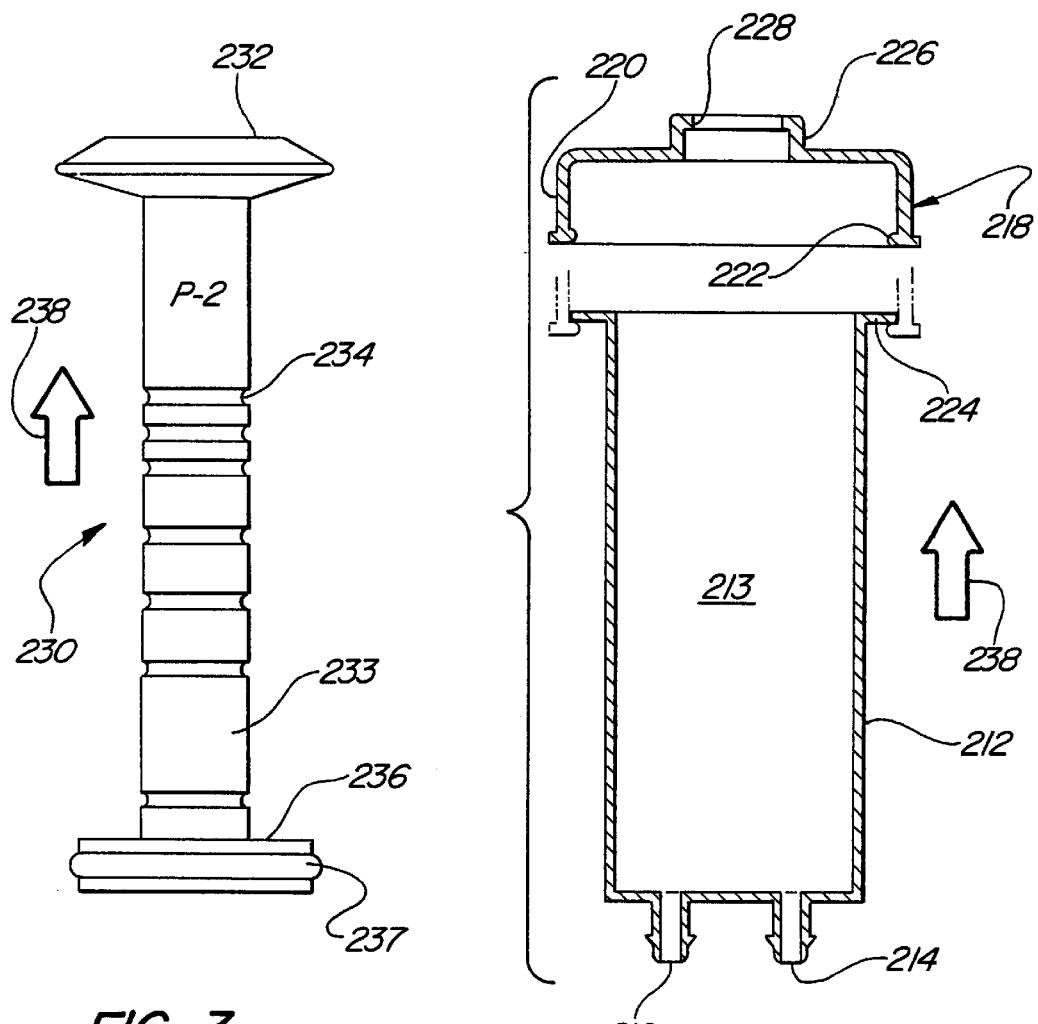
FIG-3
FIG-4
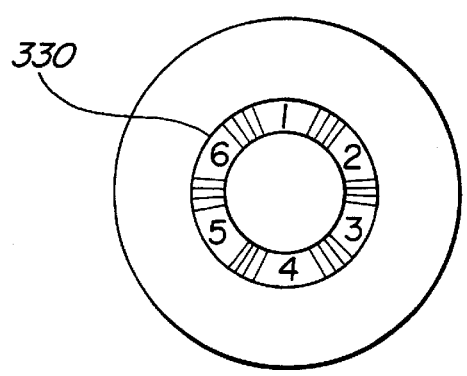
FIG-6

OIL AND GAS METERING AND MEASURING DEVICE

CROSS-REFERENCE TO RELATED APPLICATION

This application is a completion application of provisional application Ser. No. 60/016,953, for "OIL AND GAS METERING AND MEASURING DEVICE," filed May 6, 1996, the disclosure of which is incorporated by reference.

BACKGROUND OF THE INVENTION

1. Field of the Invention

The present invention concerns metering and measuring devices. More particularly, the present invention concerns metering and measuring devices for ensuring proper ratios of mixtures of separate liquids. Even more particularly, the present invention concerns metering and measuring devices for ensuring proper oil to gasoline ratios for two-cycle engine fuel mixtures.

2. Prior Art

As is known to those skilled in the art to which the present invention pertains, one of the more troublesome aspects of operating machinery employing two-cycle engines is the need to maintain the proper ratio of oil to gasoline in the fuel mixture according to manufacturer specifications. Unless this ratio is properly maintained, the engine may burn up or otherwise become damaged. Yet, absent laborious monitoring of the fuel mixture ratio, remembering at all times to add oil to the gasoline, this can be easily overlooked. The present invention, as will be subsequently detailed, overcomes this problem by providing a device that readily assures that proper ratios are maintained.

SUMMARY OF THE INVENTION

In its broadest aspect, the present invention comprises a fluid metering and measuring device comprising:

(a) a filling chamber having a fluid inlet and a fluid outlet;

(b) a one-way valve disposed in the fluid inlet for controlling fluid flow into the chamber;

(c) a one-way valve disposed in the fluid outlet for controlling flow out of the outlet;

(d) means for drawing fluid into the chamber; and (e) indicia disposed on the means for drawing for indicating the quantity of fluid in the chamber in relation to another fluid.

The present invention may be embodied in a combined gasoline and oil container. Alternatively, the present invention may be embodied in a metering device emplaceable in fluid communication with a quantity of gasoline, the metering device metering a requisite amount of oil into admixture therewith.

Thus, the device hereof may be a "stand alone" device or may be incorporated into a container for directly mixing the two separate fluids.

The fluid metering and measuring device of the present invention is particularly adapted to regulate the mixture of oil and gasoline for use in a two-stroke engine. The device has a filling chamber with a fluid inlet and a fluid outlet. One-way check valves are disposed in both the fluid inlet and the fluid outlet to prevent backflow. A gradient plunger includes a stem with grasping means external to the filing chamber which is attached to a piston within the chamber. When the stem and attached piston are pulled upwardly, oil from a first compartment flows into the chamber. Gradations or indicia on the stem indicate the amount of oil drawn into the chamber. Preferably, the gradations also indicate the proper amount of oil to be drawn in relation to various amounts of gasoline. When the stem and piston are pushed downwardly, oil flows out of the chamber.

When embodied in a unitary container oil flows into a gasoline-containing compartment. Alternatively, the device is adapted to screw into a normal one-quart oil can from which the requisite amount of oil is extracted and, then, issued into any suitable container.

The gradient stem of the device is configured to enable accurate mixing. In one embodiment the stem has circumferential grooves. In another embodiment the stem has longitudinal grooves for enabling precise metering.

For a more complete understanding of the present invention, reference is made to the following detailed description and accompanying drawings. In the drawings, like reference characters refer to like parts through the several views, in which:

BRIEF DESCRIPTION OF THE DRAWINGS

FIG. 3 is a side elevational view of a second embodiment of a plunger in accordance with the present invention;

FIG. 4 is a cross-sectional view of a filling container for use with the plunger of FIG. 3;

FIG. 6 is a top view of the handle of the plunger shown in FIG. 5.

DESCRIPTION OF THE PREFERRED EMBODIMENTS

At the outset, and as noted hereinabove, the present invention comprises a fluid and measuring device which, generally, comprises:

(a) a filling chamber having a fluid inlet and a fluid outlet;

(b) a one-way valve disposed in the fluid inlet for controlling fluid flow into the chamber;

(c) a one-way valve disposed in the fluid outlet for controlling flow out of the outlet;

(d) means for drawing fluid into the chamber; and (e) indicia associated with the means for drawing for indicating the quantity of fluid in the chamber in relation to another fluid.

Figure 1:
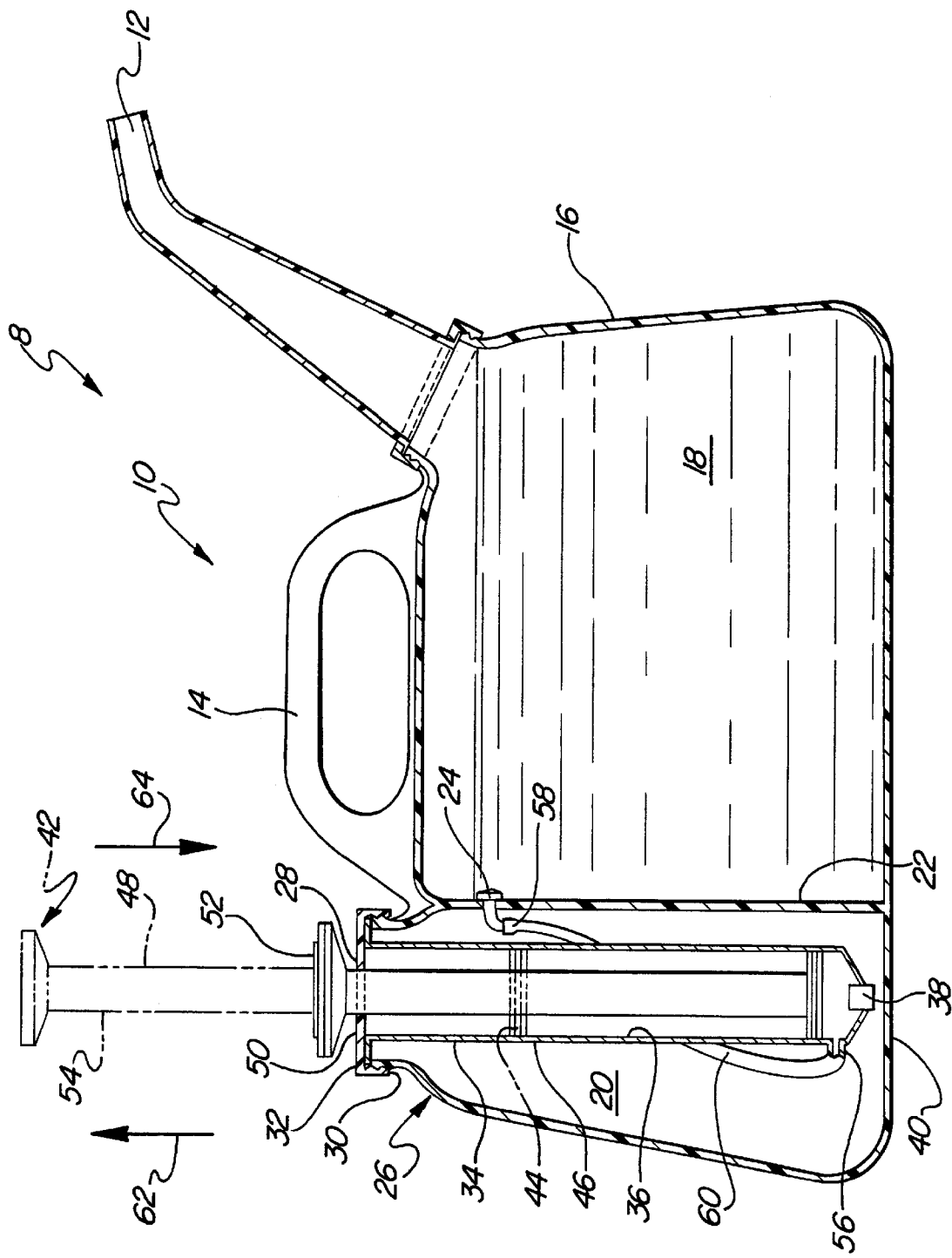
FIG. 1 is a side elevational view, partly in cross section, of a metering and measuring device in accordance with the present invention incorporated into a first container.

Referring now to the drawing, and in particular FIG. 1, there is depicted therein a fluid metering and measuring device 8 in accordance herewith and which is embodied in a container, generally, denoted at 10, for metering a requisite amount of oil for admixture with a quantity of gasoline.

As shown in the drawing and according to this aspect hereof, the present invention includes the container 10 which has a hollow interior in which a first fluid, preferably gasoline, is removably stored. The container further includes a pour spout 12 through which either gasoline or a gasoline and oil mixture may be issued. The container further includes a transport carrying handle 14.

The container 10 has an outer wall 16. Internally, the container 10 is defined by a first compartment or chamber 18 and a second compartment or chamber 20. The compartments are created by, and internally separated from each other via, a partition 22, which is integrally formed with the container 10.

A port 24 into the first compartment 18 provides fluid communication between the two compartments in a manner to be described hereinbelow.

The second compartment 20 is defined by a portion 26 of the outer wall 16. The portion 26 of the outer wall 16 has an opening or top 28 through which access into the interior of the second compartment 20 is provided. The opening or top 28 may be threaded, such as at 30.

As shown in the drawing, the metering and dispensing device 8 hereof includes an elongated tubular housing or element or 34 having an internal fluid filling chamber 36. The tubular housing 34 is removably insertable into the second compartment 20, and may be secured thereto at the opening or top 28 via a knurled knob or nut 32 that is secured thereonto at the threading 30 in a well known manner.

The element 34 includes a fluid inlet 38 through which the contents of the second compartment 20 may be issued into the fluid chamber 36. Unidirectional flow means, such as a one-way check valve 40, is housed within the fluid inlet 38 to ensure that the fluid from the second compartment 20 only enters the fluid chamber 36 through the inlet 38 and does not issue back therethrough.

The means for drawing fluid into the chamber 36 includes a slidable plunger 42 which is telescopically axially slidably disposed within the fluid chamber 36. The plunger 42 includes a toroidal piston 44 having an annular seal 46, such as an O-ring seal, circumferentially disposed therearound to prevent fluid flow therepast. The plunger 42 includes an elongated stem or rod 48 that is slidably movable in the fluid chamber 36. The piston 44 is integrally formed with the elongated rod 48.

The stem 48 projects through a suitable opening 50 formed in the nut 32. The stem 48 has an exterior handle 52 secured thereto by any suitable means, such as by being integral therewith or the like.

As shown in the drawing, the stem 48 has a plurality of gradations or other indicia 54 provided along the extent thereof and axially spaced therealong. The gradations or indicia 54 indicate the metered quantity of fluid drawn from the second compartment 20 into the fluid chamber 36, and therefrom into mixture with fluid in the first compartment 18, as described hereinbelow. These gradations, thus, ensure that the proper mixture of fluids can be obtained.

As shown in FIG. 1, the element 36 also includes a fluid outlet 56 disposed proximate the fluid inlet 38. Unidirectional flow means, such as a one-way check valve 58 or the like, prevents back flow from the outlet 56 into the fluid chamber 36. A conduit, such as a tube 60 or the like, connects the fluid outlet 56 with the port 24 in the first compartment 18, providing fluid communication therebetween. Thus, the requisite amount of liquid from the second compartment 20 can be directed into the fluid chamber 36 and therefrom metered into the first compartment 18.

In use, once the amount of gasoline in the first compartment 18 is determined, and the requirements for the proper oil to gasoline mixture are determined, as designated by the manufacturer of the engine, the plunger 42 can be drawn upwardly in the direction of the first arrow 62 to meter oil from the second compartment 20 past the check valve 40 into the fluid chamber 36. The amount of oil drawn into the fluid chamber 36 is shown by the gradations 54 on the stem 48 in both quantity, and, preferably, in relation to the amount of gasoline contained in the first compartment 18. Once the proper amount of oil has been metered into the fluid chamber 36, the plunger 42 can then be moved downwardly in the direction of the second arrow 64, thereby causing the oil within the fluid chamber 36 to flow through the outlet 56, past the check valve 58, through the conduit 60, through the port 24, and into the first compartment 18 by forces exerted by the piston 44.

In practicing this embodiment, it is preferred that the first and second compartments be formed as an integral unit. However, it is to be appreciated that the second compartment 20 can be retrofitted onto a conventional gasoline container by providing an opening in the gasoline container wall, providing a suitable port fitting for the opening in the gasoline container wall, and fitting the conduit 60 to the port for fluid communication therebetween.

In either event, this embodiment provides a quick and efficient way of directly metering the requisite amount of oil into the gasoline containing compartment.

Figure 2:
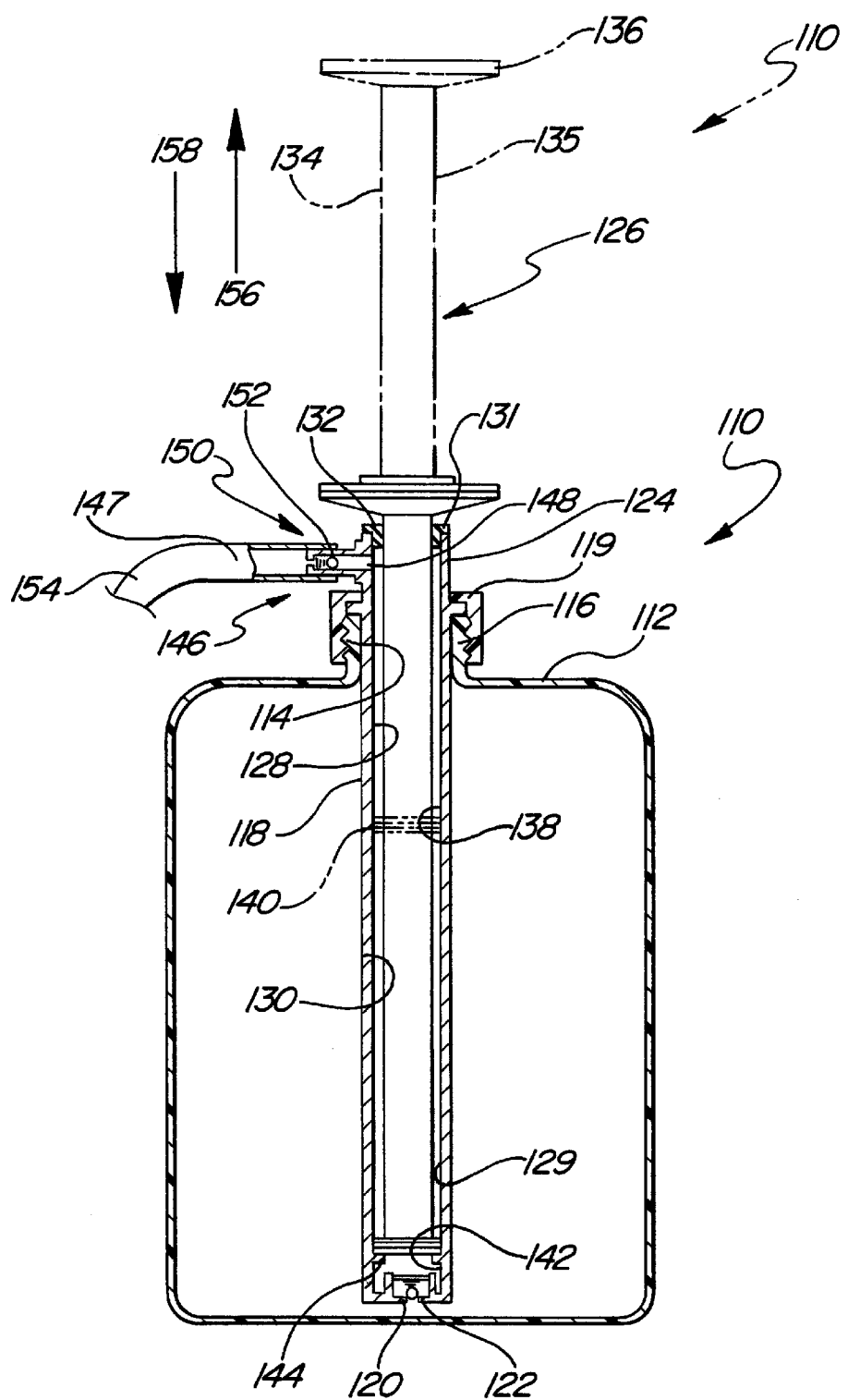
FIG. 2 is a side elevational view, partly in cross section, of the metering device hereof, wherein the plunger is depicted in a first position and a second position, and which is incorporated into a second container.

In FIG. 2, there is depicted the deployment of the device hereof in connection with another container. According to this embodiment, the metering and dispensing device, generally, denoted at 110, is particularly adapted for measuring out the requisite quantity of oil from a conventional one-quart oil container 112.

The container 112 has a threaded spout 114 about an opening 116, to which is removably mounted the metering and dispensing device 110 hereof in the same manner heretofore described.

The metering and dispensing device 110 hereof is substantially similar to that described with respect to the first embodiment of FIG. 1. The device 110 comprises an elongated outer tubular member or element 118 that is adapted to be removably disposed within the interior of the container 112. A threaded connector, such as a knurled nut 120, is carried exteriorly of the tubular member 118, and is used to threadably mount the dispenser 110 to the container 112.

The elongated tubular member 118 has a closed first end 120 having an opening formed therein that defines a fluid inlet 122, and a second end 124.

A second tubular member 128, having a diameter less than that of the first tubular member 118, is concentrically disposed within the first or outer tubular member 118 and extends between the first and second ends thereof. The space or gap between the first and second tubular members 118 and 128 defines an annular passage 130 between the interior wall of the first tubular member 118 and the exterior wall of the second tubular member 128. The interior of the second tubular member 128 defines a chamber 129.

A stop or seal 131 closes off the annular passage 130 at the second end 124 of the first tubular member 118 and holds the second tubular member 128 in spaced relation to the first tubular member 118.

A central opening 132 is provided in the stop 131, through which projects a plunger or plunger assembly 126. The plunger 126 includes a rod or stem 134 having a handle 136 at one or its first end and a piston 138 at its other or second end. The piston 138 is affixed to the second end of the rod and is axially slidably movable within the chamber 129 of the second tubular member 128.

As shown in the drawing, the stem 134 has a plurality of gradations or other indicia 135 provided along the extent thereof and axially spaced therealong. The gradations or indicia 135 indicate the metered quantity of fluid drawn from the container 112 into the fluid chamber 129, and therefrom discharged for mixture with gasoline from another container (not shown), as described hereinbelow. These gradations, thus, ensure that the proper mixture of fluids can be obtained.

An annular seal, such as an O-ring seal 140, prevents fluid flow past the piston 138 in the well known manner.

Unidirectional flow means, such as a one-way check valve 142, is housed within the inlet 122 to prevent any fluid drawn into the fluid chamber 129 from flowing out of the inlet 122 and past the valve 142, and also assists in maintaining the spaced relationship between the first and second tubular members 118 and 128.

An outlet port 144 is formed in the second tubular member 128 and is in fluid communication with the annular passage 130.

As shown in FIG. 2, a fluid outlet assembly 146 is proximate the second end 124 of the second tubular member 128 and is disposed exteriorly of the container 112. The outlet assembly 146 includes an outlet channel 147 in fluid communication with an outlet port 148.

Unidirectional flow means 150, such as a one-way check valve 152, is disposed in the outlet channel 147 to prevent back flow from the outlet 146 into the fluid chamber 129. A conduit 154 is in fluid communication with the outlet channel 147 to permit fluid to flow therethrough.

In use, once the amount of gasoline in another container (not shown) is determined, and the requirements for the proper oil to gasoline mixture are determined, as designated by the manufacturer of the engine, the plunger 126 can be drawn upwardly in the direction of the first arrow 156 to meter oil from the chamber 112 past the check valve 142 into the fluid chamber 129. The amount of oil drawn into the fluid chamber 129 is shown by the gradations 135 on the stem 134 in both quantity, and, preferably, in relation to the amount of gasoline contained in another container (not shown). Once the proper amount of oil has been metered into the fluid chamber 129, the plunger 126 can then be moved downwardly in the direction of the second arrow 158, thereby causing the oil within the fluid chamber 129 to flow through the outlet 144, through the annular passage 130, through the port 148, past the check valve 152, through the outlet channel 147, and therefrom into any other suitable container (not shown) by forces exerted by the piston 138.

It is to be appreciated that the dispenser 110 can be removed from this one container and mounted to another one.

Of course, other container configurations can be used herein with the device hereof adapted for mounting thereto.

Referring now to FIGS. 3 and 4 there is depicted therein a further embodiment of the present invention. According to this embodiment, the device includes a tubular housing or element 212 the interior of which defines a filling chamber 213. A fluid inlet 214 and a fluid outlet 216 are in fluid communication with the chamber 213, as shown.

Disposed within each fluid inlet and fluid outlet is a one-way flow means or unidirectional flow means such as a one-way check valve or the like (not shown) for controlling fluid flow as hereinabove described. The housing 212 has a top end which includes an integral toroidal shoulder or flange 224.

A cap 218 seats atop the tubular element or housing 212 and closes same. The cap 218 includes a circumferential side wall 220 having an inwardly directed bead 222 which abuts against the shoulder 224. The bead 222 engages the shoulder or flange 224 as shown in phantom in FIG. 4 to provide closure of the element 212.

The cap 218 further includes a reduced diameter duct 226 integrally formed therewith and projecting outwardly therefrom. The duct 226 has a predetermined internal diameter for accommodating axial, slideable movement of a plunger 230 as described hereinbelow.

An inwardly directed lip 228 is circumferentially inwardly projectingly disposed at the terminus of the duct 226, as shown.

As hereinabove noted, a plunger, generally, denoted at 230 is axially slideably disposed within the cylinder 212. The plunger 230 includes a handle 232 which seats atop the cap 218 and projects outwardly through the duct 226. The plunger, also, includes a shaft or stem 233. The stem 233 is provided with a plurality axially spaced apart annular grooves 234. The space or distance between the grooves defines a gradient for assuring proper mixture of fluid ratios.

The end of the plunger opposite that of the handle includes a piston 236 secured thereto. A sealing member such as an O-ring 237 or the like is circumferentially disposed about the piston to provide sealing engagement between the plunger and the side wall of the cylinder 212.

As the plunger is pulled upwardly in the direction of the arrow 238, the lip 228 will engage a groove 234. Thus, depending on the desired ratio of mixture of the fluid, i.e. oil to gas, will determine the degree to which the plunger is extracted through the duct.

It is to be appreciated that the cap is formed from a resilient material to enable the plunger to move past the lip 228. Thus, the cap is flexibly resilient so that the lip can be removed from any one groove and lock in any other groove 234.

The requisite ratio indicia, designated in FIG. 3 as P-2, can be provided along the extent of the stem or otherwise provided at any convenient location.

Figure 5:
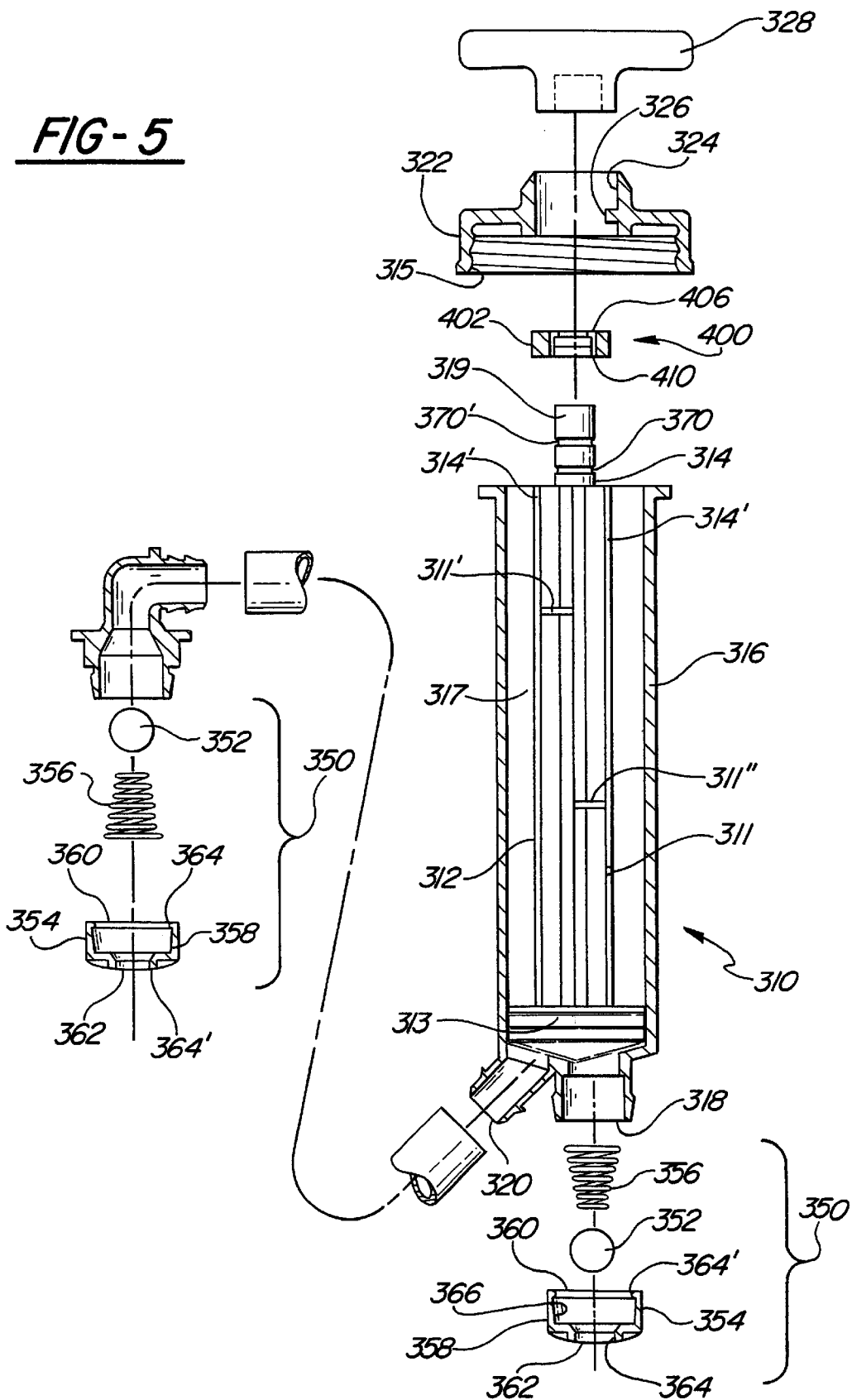
FIG. 5 is a side elevational, exploded view of a third embodiment of the metering device hereof.

Referring now to FIGS. 5 and 6 there is depicted therein a further embodiment of the metering device hereof. Again, the device 310 hereof includes a plunger 312 having a piston 313 at the lower end thereof, is adapted to be axially slideably movably disposed within a hollow tubular housing 316 defining a fluid filling chamber 317 which has a unidirectional fluid inlet 318 and a unidirectional fluid outlet 320. As shown, the piston 313 is a tapered member and adapted to as shown, the prevent cavitation at the junction between the seal and the walls when the plunger is moved.

The plunger 312 is provided with a plurality of longitudinally extending circumferentially disposed longitudinally grooves 314, 314', etc. Each groove 314, 314', etc. has a predetermined length which corresponds to a metered quantity of fluid entering into the chamber 317 through the inlet 318 in the manner heretofore described. Thus, the grooves dictate the amount of fluid entering into the chamber 317 to assure proper ratios.

A cap 322 is removably secured to the cylinder 316 by any convenient mode such as by threaded interconnection via threading or thread 315 or the like. The cap 322 further includes a duct or passageway 324 through which the plunger 312 is extended or projected. A stop or stop member 326 is disposed within the duct of the cap and which, upon engagement with a limited or terminus 311, 311' etc. of any groove, 314, 314', etc., thus, limits the degree to which the plunger can be pulled through the top of the cap. Thus, the stop is alignable with the requisite groove for assuring proper metering.

To achieve this, and as shown in FIGS. 5 and 6, the plunger 312 includes a stem 319 at the upper end thereof and connects to a handle 328 which enables rotation thereof. The top of the handle bears indicia 330 to denote requisite ratios. The handle enables the plunger to be rotated to align a groove or slot 314, 314', etc. with the stop 326, the handle 328 seating atop the cap 322, and projecting through the duct 324 and interconnected to the plunger 312 through a snap lock as described below.

In FIG. 5, there is depicted a universal check valve or check valve device for assuring unidirectional flow into the inlet and outlet and which can be used in connection with either the fluid inlet or fluid outlet and which is, generally, denoted at 350. Herein the check valve 350 includes a ball 352 which is caged within a housing 354. A biasing member such as a spring 356 urges against the ball. The housing includes a side wall 358, a top wall 360 and a bottom wall 362. The bottom wall and the top wall each have an opening 364, 364' respectively, provided therein to enable fluid flow past the ball 352. The side wall may be internally threaded or snap fitted to an associated inlet or outlet.

By reversing the placement of the ball and biasing member in relation to the top wall and bottom wall, as shown, the check valve can be used to assure unidirectional fluid flow on the outlet side of a cylinder, as shown.

It is further contemplated that in order to assure that the correct ratio is always attained for any specific engine, once the proper ratio therefor is determined, that a device for locking the plunger in its appropriate position be provided. Thus, and as shown in FIG. 5, a snap locking ring 400 assembly which properly orients a pre-selected groove of the plunger 312 with the stop 326. The ring 400 includes a snap clip 402 which is fixedly mounted to the plunger 312 such as by friction or the like. As shown, the stem portion which projects outwardly from the housing has a pair of spaced apart circumferential grooves, 370 and 370'. The clip 402 is slideably emplaceable over the stem and engages the grooves. The clip telescopes into the handle to achieve A interconnection therebetween. The clip includes a plurality of depending fingers 410 which project into a pre-determined groove or slot or channel 314, 314' etc.

In use, the clip is first interconnected to the handle, and the clip is positioned in the upper groove, 370' to render the handle freely rotatable. The handle is, then, rotated to align the proper groove 314 with the stop member 326. Then, by a downward force, the clip is urged into the lower groove 370 which forces the fingers into the non-selected grooves to preclude any alignment thereof with the stop. This renders the dispenser fixed for a pre-selected ratio metering. In this manner all but the pre-selected groove are precluded from having the stop member being axially slidable therewith. Thus, the stop member provided in the cap can only engage one longitudinal groove 314, 314', etc. In this manner inadvertent rotation of the plunger about the vertical axis to potentially provide an improper ratio is precluded.

Having, thus, described the invention, what is claimed is:

1. A fluid metering and measuring device, comprising:
    an internally hollowed container having a partition subdividing said container into a first compartment and a second compartment, said first compartment further including a dispensing spout;
    an elongated and substantially tubular housing extending within said second compartment, an opening formed in a portion of an outer wall defining said second compartment and through which is inserted said elongated and tubular housing;
    a plunger assembly sealingly engaged with an interior of said tubular housing and being actuated in a first upward direction to withdraw a specified volume of a fluid being held within said second compartment;
    unidirectional flow means associated with said plunger assembly, said unidirectional flow means further comprising a fluid inlet located proximate a bottom of said elongated and tubular housing and within said second compartment, a one-way check valve located at said fluid inlet; and
    said plunger assembly being actuated in a second downward direction, causing the volume of fluid to flow through a conduit extending within said second compartment from an outlet of said tubular housing to a port communicating said second compartment with said first compartment, the volume of fluid admixing with a quantity of a further fluid held within said first compartment.

2. The fluid metering and measuring device according to claim 1, said plunger assembly further comprising a slidable and toroidal shaped piston having an annular shaped O-ring seal.

3. The fluid metering and measuring device according to claim 2, said plunger assembly further comprising an elongated stem slidably movable within a fluid chamber defining said interior of said tubular housing, said toroidal piston being integrally formed with said elongated stem.

4. The fluid metering and measuring device according to claim 3, further comprising a plurality of indicia gradations placed at axially spaced locations along said stem, said gradations corresponding to indicated metered quantities of the fluid drawn from the second compartment.

5. The fluid metering and measuring device according to claim 1, said dispensing spout further comprising an elongated pour spout projecting from said first compartment.

6. The fluid metering and measuring device according to claim 1, said container further comprising a transport carrying handle.

7. The fluid metering and measuring device according to claim 1, further comprising an opening formed in a portion of an outer wall defining said second compartment and through which is inserted said elongated and tubular housing.

8. The fluid metering and measuring device according to claim 7, said opening further comprising exteriorly facing threads, an interiorly threaded nut being interengagingly secured over said opening, an opening being formed within said nut and through which extends said stem.

9. The fluid metering and measuring device according to claim 1, further comprising said second compartment containing a volume of oil.

10. The fluid metering and measuring device according to claim 1, further comprising said first compartment containing a volume of gasoline.

11. The fluid metering and measuring device according to claim 1, further comprising a cap removably secured to said tubular housing, said cap further including a passageway through which said plunger assembly extends, said plunger assembly being provided with a plurality of longitudinally extending and circumferentially disposed grooves, each of said grooves having a predetermined length corresponding to a metered quantity of fluid drawn into said tubular housing.

12. The fluid metering and measuring device according to claim 11, further comprising a stop member being disposed within a duct of said cap and, upon engagement with a terminus associated with a selected groove of said plunger assembly, limits a degree to which said plunger assembly can be actuated in said first upward direction.

13. The fluid metering and measuring device according to claim 12, further comprising an elongated stem slidably movable within a fluid chamber defining said interior of said tubular housing, a handle integrally formed with said stem and enabling rotation of said stem.

14. The fluid metering and measuring device according to claim 13, further comprising an indicia placed upon a top of said handle, said indicia denoting requisite ratios of mixtures of said volumes of fluid.

* * * * *